United States Patent [19]

Myers, Sr.

[11] Patent Number: 4,900,045
[45] Date of Patent: Feb. 13, 1990

[54] ALTERNATIVE BICYCLE DRIVE DEVICE

[76] Inventor: Raymond T. Myers, Sr., 1536 Dominion Ave., Pasadena, Calif. 91104

[21] Appl. No.: 264,155

[22] Filed: Oct. 28, 1988

[51] Int. Cl.⁴ .............................................. B62M 1/16
[52] U.S. Cl. .................................... 280/233; 280/246; 280/243; 280/234; 272/73
[58] Field of Search ...................... 280/242.1, 243, 244, 280/246, 249, 250, 251, 252, 255, 233, 234; 272/79 R, 73; 180/74, 221

[56] References Cited

U.S. PATENT DOCUMENTS

| | | | |
|---|---|---|---|
| 534,537 | 2/1895 | Williams | 280/234 |
| 616,021 | 12/1898 | Schaibly | 280/234 |
| 2,207,305 | 7/1940 | Souhart | 280/234 |
| 2,725,111 | 11/1955 | Mennesson | 180/221 |
| 3,431,994 | 3/1969 | Wood, Jr. | 180/221 |
| 3,701,543 | 10/1972 | Clark et al. | 280/234 |
| 3,841,428 | 10/1974 | Bialek | 180/74 |
| 4,548,420 | 10/1985 | Patroni | 280/234 |
| 4,579,188 | 4/1986 | Facer | 180/221 |
| 4,733,880 | 3/1988 | Wilhelm | 280/234 |

Primary Examiner—Charles A. Marmor
Assistant Examiner—Donn McGiehan
Attorney, Agent, or Firm—Christie, Parker & Hale

[57] ABSTRACT

An alternative drive device for a bicycle comprising a drive wheel assembly having two drive shafts and a drive wheel with dual rachet assemblies therein; vertical frame for mounting the drive wheel assembly in frictional engagement with the bicycle front tire and connected to a first horizontal bar; vertical frame extension connected to said first horizontal bar and a second horizontal bar, and attachable to a bicycle's handle bars; a pair of handles slidably mounted on the second horizontal bar, attached to a cable and pulley system that engages the drive wheel assembly, and capable of driving the device by reciprocal motion along the second horizontal bar wherein the motion of the handles causes the drive wheel, and hence the bicycle's front tire, to rotate.

7 Claims, 3 Drawing Sheets

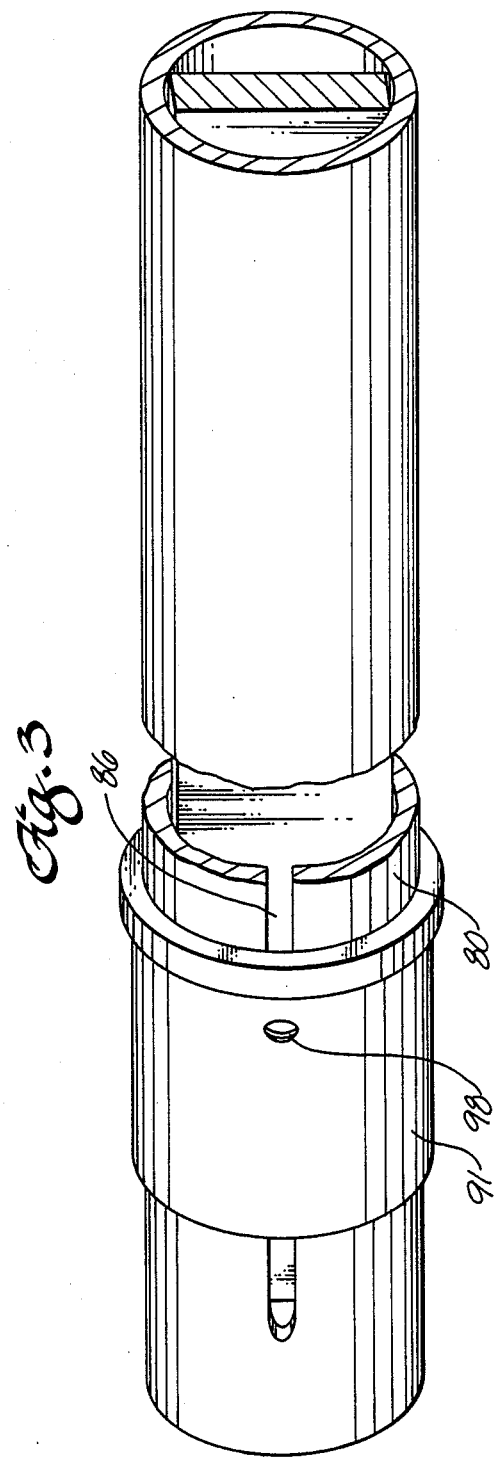
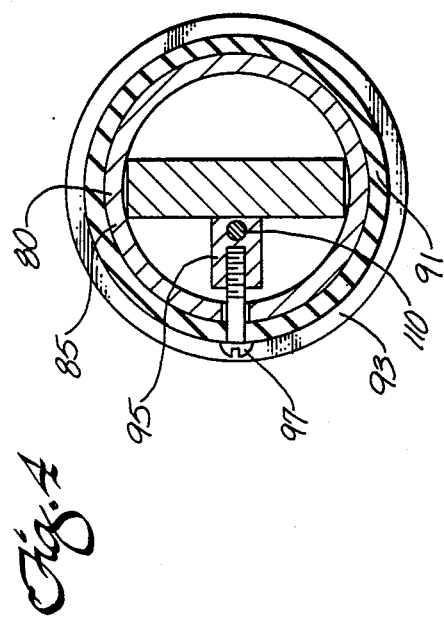

ALTERNATIVE BICYCLE DRIVE DEVICE

The present invention relates generally to the field of bicycles used for exercise. In particular, the invention provides alternative motive means for propelling a conventional bicycle utilizing lateral motion of a rider's arms, thereby exercising the rider's arms and chest.

Background of the Invention

Bicycles having nonconventional motive means, both human and engine powered, are known. U.S. Pat. No. 534,537 (Williams) discloses a device for propulsion of the front wheel of a bicycle using hand-held levers in a rowing motion. A pair of chains are connected to the front wheel and the hand-held levers. By pushing and pulling the levers the chain is caused to move, thereby rotating the front wheel. Similar devices described in U.S. Pat. Nos. 616,021 (Schaibly) and 2,207,305 (Souhart) rely on the motion of handlebar extremities upwardly and downwardly about an axis at the center of the handlebar. U.S. Pat. No. 4,733,880 (Wilhelm, III) discloses a device having a running rigging connection between handgrips and foot pedals, requiring a rowing motion to propel the bike with the arms. Synchronization of handgrips and foot pedals is provided with a line under tension. The line is mounted on each foot pedal, a sheave near the bicycle seat, a sheave on the front of the bicycle frame, and each handgrip. The Wilhelm bicycle's handlebars are of a non-conventional design, and apparently lack lateral support making the bicycle difficult to ride. Each of the prior art devices is a specially manufactured bicycle.

Summary of the Invention

The present invention is easily and conveniently attachable to a conventional bicycle's handlebars, from which the invention engages the front tire of the bicycle in a frictional drive relationship. Motive power is provided through longitudinal "pumping" action of two handles on a horizontal bar, the bar being connected to a drive wheel assembly by an endless cable.

In contrast to the prior art devices described above, the present invention is used in conjunction with a conventional bicycle. The inherent structural integrity of the bicycle's frame and handlebars is thus maintained. The device is readily manufactured and packageable as a kit for retrofitting a conventional bicycle with an alternative drive mechanism. The device is quite easily mountable on a bicycle's handlebars. A lateral, rather than a rowing, motion is used to operate the device. Thus, a rider's pectoral muscles, in particular, are conditioned through use of the present invention.

The invention comprises a drive wheel mounted in front of the steering column of a bicycle in direct engagement with the bicycle's front tire. Two drive shafts or axles extend from the drive wheel and are supported by generally vertical frame means. Within the drive wheel, the drive shafts are linked to a pair of ratchet assemblies that rotationally powers the drive wheel to propel the bicycle in a forward direction only.

The vertical frame means are attached to a first horizontal bar. The first horizontal bar provides transverse structural integrity, and mounts several pulleys used in the device. The vertical frame means attaches to the bicycle handlebars with a pair of clamps.

A second horizontal bar is attached to the vertical frame means, in proximity to the chest of a bicycle rider as he or she sits on the seat of the bicycle. Multiple pulleys are mounted on the bar, and an endless cable is strung around the pulleys on this bar, as well as around the pulleys on the first horizontal bar. The cable is also helically wrapped around portions of the two drive shafts.

A pair of sliding handles are mounted on the second horizontal bar, and the handles are securely attached to the endless cable. The cable and pulleys form a dynamic interconnection between the handles and the drive wheel. The resulting configuration transforms sliding, longitudinal motion of the handles into rotary motion of the drive wheel, and hence the bicycle front tire. The bar can be used both to steer and to power the bicycle.

The device can be used to drive a bicycle, either in conjunction with conventional foot pedals, or by itself. Use of the device provides an effective means of conditioning various muscles of the chest and arms.

By loosening the clamps, the drive wheel can be pivoted away from the bicycle front wheel, allowing free rotation of the front wheel, if desired.

Brief Description of the Drawings

FIG. 3 is a schematic view of the second horizontal bar with a handle mounted thereon;
and
FIG. 4 is a cross-section taken along line 2—2 of FIG. 3.

Detailed Description

Figure 1:
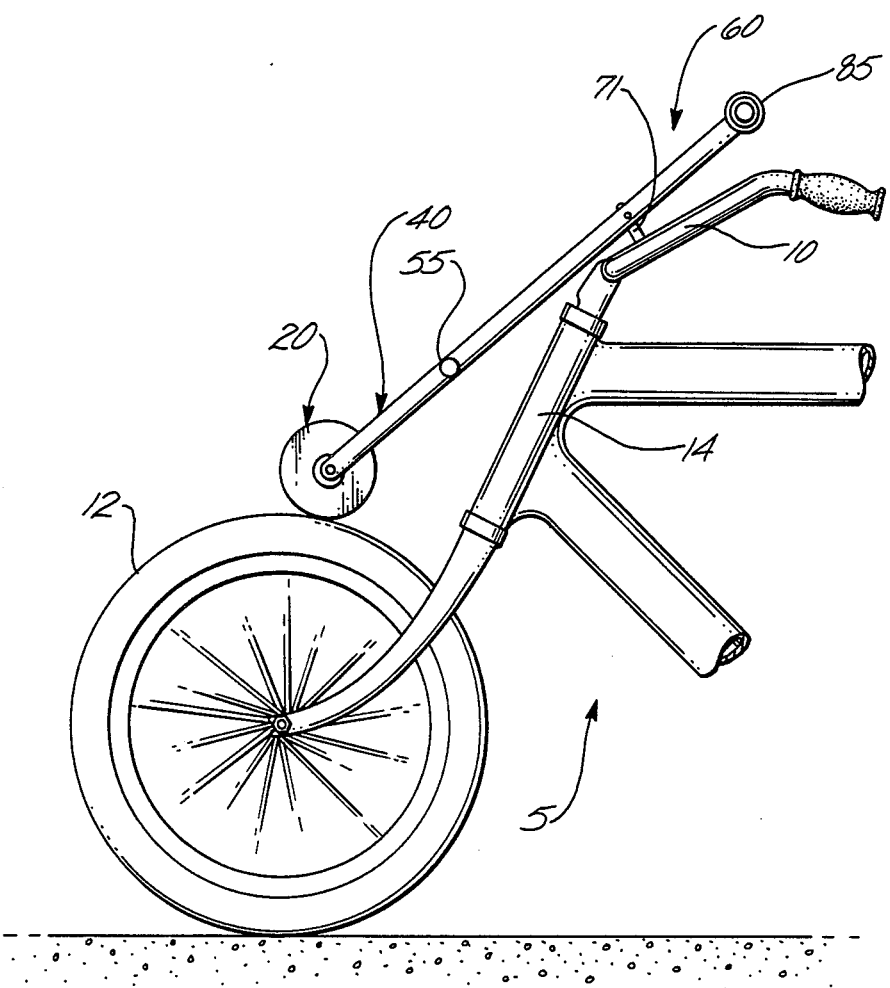
FIG. 1 is a side view of the invention.

A bicycle 5 equipped with the present invention is shown in FIG. 1. The device is attached to the handlebars 10 of the bicycle such that the drive wheel assembly 20 is in frictional drive engagement with the bicycle front tire 12.

The drive wheel assembly 20 is mounted in front of the bicycle steering column 14 on substantially vertical frame means 40. As is shown more clearly in FIG. 2, the vertical frame means 40 consists of left and right inner frame elements 42 and 43, respectively, and left and right outer frame elements 41 and 44, respectively. One end of each frame element is fastened to a first horizontal bar 50, with the other end of each frame element mounting a left or right drive shaft, 21 and 22, respectively.

Extending beyond first horizontal bar 50 is a substantially vertical frame means extension 60. In one embodiment of the invention, a tubular housing 55 encloses bar 50, as indicated in FIG. 1. Vertical frame means extension 60 comprises left and right frame elements 61 and 62, respectively, which provide structural support and means for mounting the alternative drive device to the bicycle 5. In a preferred embodiment, a pair of clamps, 71 and 72, attach frame elements 61 and 62 to the handlebars 10 of the bicycle. This is shown in FIG. 1. If desired, the clamps can be loosened and the drive wheel assembly 20 pivoted away from the bicycle front wheel, thereby allowing free rotation of the front wheel of the bicycle.

Figure 2:
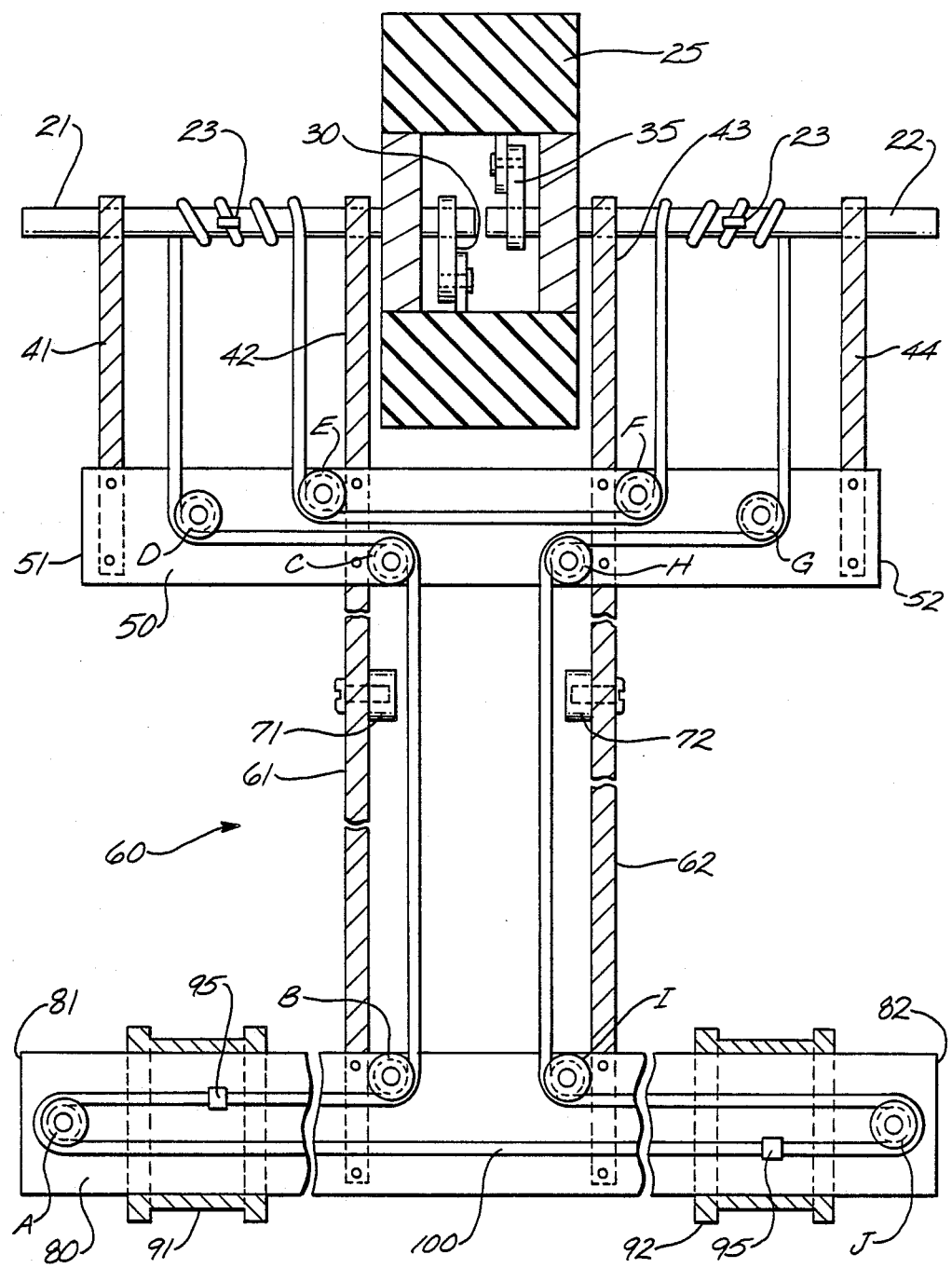
FIG. 2 is a schematic top view of the invention.

Vertical frame means extension 60 also supports a second horizontal bar 80, as shown in FIG. 2. A tubular housing 85 encloses bar 80. Housing 85 has a pair of elongated slots, represented by the visible slot 86 in FIG. 3, formed therein, parallel to the housing and located near opposite ends of the housing. Concentrically mounted on housing 85 are slidable handles 91 and 92, more fully described below.

Bars 50 and 80 have a plurality of pulleys, A–J, mounted thereon, for guiding an endless cable or chain 100. The cable is strung along the device in a closed path. In the preferred embodiment shown in FIG. 2, the configuration is as follows: Starting at the left end of bar 80, the cable 100 is guided from pulley A to pulley B along the left portion of bar 80. From pulley B, the cable runs parallel to left frame element 61, and is guided along the left portion of first horizontal bar 50 by pulley C. From pulley C, the cable is guided around pulley D to the left drive shaft 21. Cable 100 is helically wound around the left drive shaft 21, and then returns to bar 50 at pulley E. From pulley E, the cable runs parallel to bar 50 and is guided toward the right drive shaft 22 by pulley F. The cable is helically wound around the right drive shaft 22 in a manner similar to the left drive shaft, but with an opposite winding orientation. The cable is attached centrally within each helix to prevent slippage on the drive shafts as shown by connections 23 in FIG. 2. Cable 100 is directed from the right drive shaft back to bar 80 by pulleys G–J, in a manner similar to that just described. From pulley J, the cable runs parallel to bar 80, back to pulley A.

Slidable handles 91 and 92 are firmly connected to the endless cable 100. As shown in FIG. 4, a fastener 95, having a tapped end, is crimped about cable 100. A bolt 97 is inserted through hole 98 in the left handle, through left slot 86 in housing 85, and into the tapped end of the fastener 95. Handle 91 is thereby secured to the endless cable, yet is free to slide along the housing 85 by virtue of the elongated slot 86. Similarly, the right handle 92 is fastened to the endless cable 100 at the opposite end of the second horizontal bar 80.

As shown in FIG. 2, left handle 91 is securely attached to a portion of the endless cable 100 between pulleys A and B, at the left end 81 of bar 80. Right handle 92 is attached to a portion of the endless cable 100 between pulleys J and A, near the right end 82 of the bar 80. Tension along the cable 100 is therefore maintained between pulleys A and J, as the handles are slidably moved towards and away from each other along bar 80. The cable and pulleys provide dynamic interconnection between the handles and the drive wheel assembly.

If desired, each handle can be padded with an outer foam cushion 93.

When the device is operated, a bicycle rider grips handles 91 and 92 and reciprocates them towards and away from each other along the housing 85. The motion of the handles is restricted by the length of the longitudinal slot 86 and the opposing slot on the right side of housing 85. Thus, the handles neither touch each other nor slide off the bar 80.

The drive wheel assembly 20 comprises left and right drive shafts 21 and 22, a drive wheel 25, and left and right ratchet assemblies 30 and 35. In the preferred embodiment, both ratchet assemblies 30 and 35 are mounted within the drive wheel 25.

Drive shafts 21 and 22 extend into the center of drive wheel 25 from opposite sides, as shown in FIG. 2. The inner ends of drive shafts 21 and 22 are attached to ratchet assemblies, 30 and 35 respectively, and are thereby connected to the drive wheel.

Ratchet assemblies 30 and 35 convert rotational motion of drive shafts 21 and 22, respectively, into drive wheel 25 rotary motion.

Because each handle is connected to the endless cable 100, linear motion of the handles is converted into rotary motion of the drive wheel 25, and the bicycle front tire 12.

Reciprocation of the cable forces the cable to wind and unwind on each drive shaft 21 and 22. Thus, longitudinal motion of the handle about bar 80 forces the left drive shaft 21 to rotate clockwise for the circumferential length of the helix, then counterclockwise when the cable changes its direction of reciprocation. The helical direction of the cable about the two drive shafts is such that as the left drive shaft 21 rotates clockwise, the right drive shaft 22 rotates counterclockwise. Even though each drive shaft rotates both clockwise and counterclockwise, the ratchet assemblies 30 and 35 engage the drive wheel 25 to only rotate in one direction.

The invention has been described in an exemplary and preferred embodiment, but it is not limited thereto. Those skilled in the art will recognize that additional modifications and improvements can be made to the invention without departure from its essential spirit and scope. For example, instead of mounting operable handles on a horizontal bar, a generally vertical bar could be employed. Longitudinal reciprocation of the handles along the bar would drive the endless cable. Other modifications are also within the scope of the invention. Therefore, the invention is not limited by the above disclosure, but only by the following claims.

What is claimed is:

1. An alternate drive device for a standard bicycle without mechanical modification to the bicycle comprising:
    a drive wheel assembly adapted for rotatably frictionally engaging a bicycle front wheel;
    means for supporting the drive wheel assembly;
    means for removably attaching the support means to a bicycle;
    a bar attached to the support means, having at least one handle slidably mounted thereon for reciprocal motion along an axis of the bar; and,
    dynamic interconnection means linking the said at least one handle with the drive wheel assembly;
    wherein the interconnection means converts reciprocal motion of the at least one handle along the bar into rotary motion of the drive wheel assembly, thereby driving the bicycle.

2. An alternative drive device as defined in claim 1, wherein the drive wheel assembly comprises:
    a drive wheel, a pair of oppositely oriented ratchet assemblies connected to the drive wheel, a left drive shaft connected to one of the ratchet assemblies, and a right drive shaft connected to the other ratchet assembly.

3. An alternative drive device as defined in claim 1, wherein the removable attachment means comprises at least one clamp removably attachable to a bicycle's handlebars said clamp adjustable to position said drive wheel assembly in a first position frictionally engaging the bicycle front wheel and a second position disengaged from the bicycle front wheel allowing free rotation of the bicycle front wheel.

4. An alternative drive device as defined in claim 2, wherein the dynamic interconnection means comprises an endless cable linked to the drive wheel assembly and the at least one handle, and a plurality of pulleys for guiding the cable.

5. An alternative drive device as defined in claim 4, wherein a first portion of the endless cable is helically wound about the left drive shaft, and a second portion of the endless cable is helically wound about the right drive shaft; wherein reciprocation of the at least one handle causes the endless cable to alternatively wind and unwind on each drive shaft, thereby causing the drive wheel assembly to rotate.

6. An alternative drive device as defined in claim 1, further comprising a tubular housing that encloses the bar, having at least one elongated slot formed therein for mounting the at least one handle.

7. An alternative bicycle drive device comprising:
- a drive wheel adapted for rotating frictional engagement with the front wheel of a bicycle;
- first and second axles supporting the drive wheel;
- first and second ratchets having opposite rotational engagement connecting the first and second axles respectively to the drive wheel;
- a first horizontal bar;
- first and second frame members connected to the first horizontal bar in spaced relation for rotatably supporting the first and second axles proximate the drive wheel;
- third and fourth frame members connected to the first horizontal bar in spaced relation for rotatably supporting the first and second axles distal the drive wheel;
- a second horizontal bar connected to the first and second frame members;
- an endless cable helically wrapped clockwise for a plurality of turns about the first axle and helically wrapped counterclockwise for a plurality of turns around the second axle, the endless cable engaging each axle whereby longitudinal motion of the cable imparts rotational motion to the first axle and opposite rotational motion to the second axle;
- first and second handles slidably mounted to the second horizontal bar, the first and second handles connected to the endless cable for oppositely directed reciprocating motion;
- means for attaching the first and second frame members to the handlebars of a bicycle; and,
- sheave means mounted to the first and second horizontal bars for supporting the endless cable.

* * * * *